UNITED STATES PATENT OFFICE.

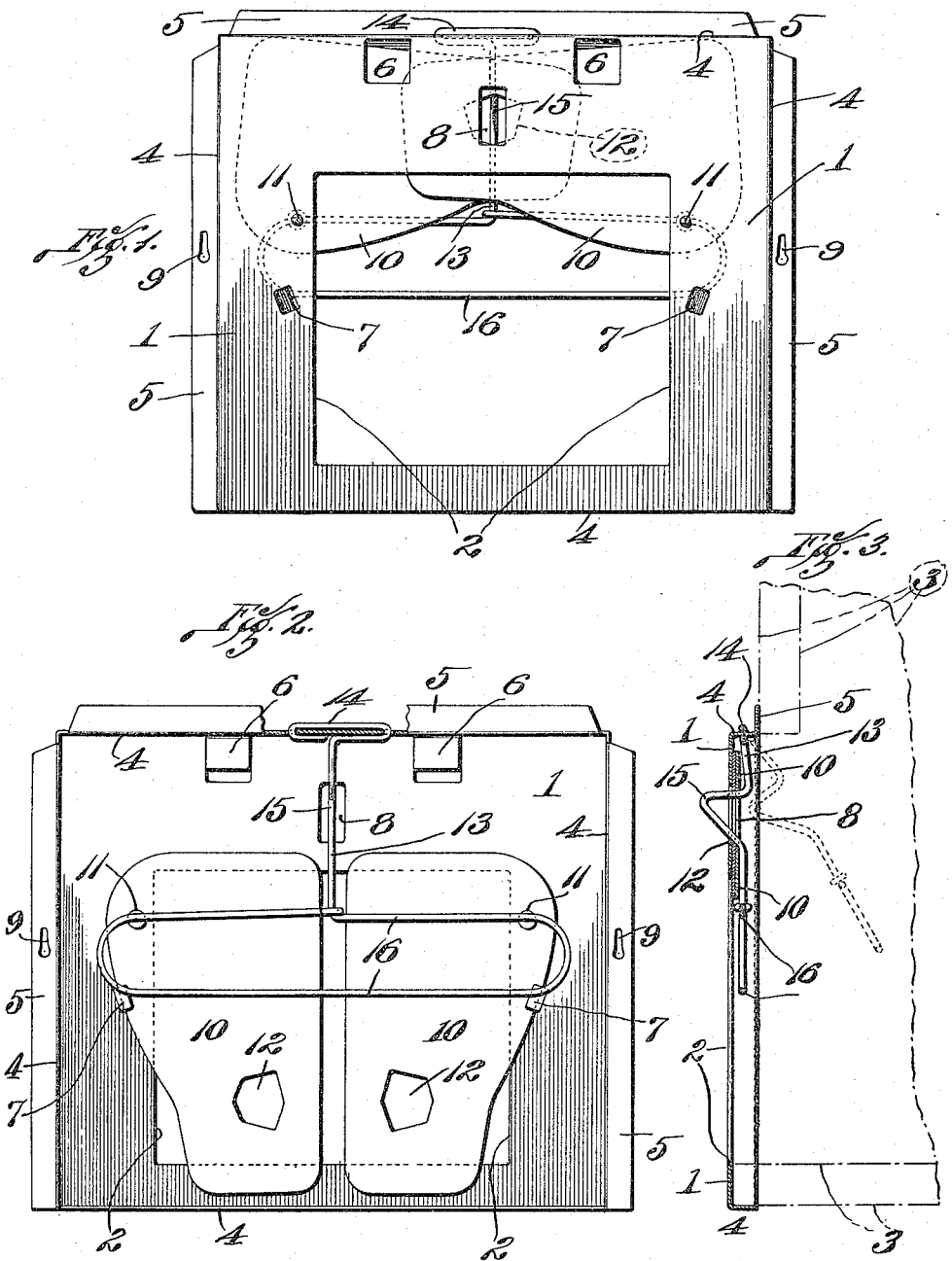

FRANK N. CORDELL, OF ST. LOUIS COUNTY, MISSOURI.

ATTACHMENT FOR TRAP-NESTS.

1,156,589.  Specification of Letters Patent.  Patented Oct. 12, 1915.

Application filed May 22, 1915. Serial No. 29,742.

*To all whom it may concern:*

Be it known that I, FRANK N. CORDELL, a citizen of the United States, residing in the county of St. Louis and State of Missouri, have invented certain new and useful Improvements in Attachments for Trap-Nests, of which the following is a specification.

This invention relates to trap-doors for nests for hens and other fowl and has for its object to provide a device of the character described that is simple in construction and operation and which is adapted to be removably applied in connection with an ordinary nest for hens.

A further object is to provide a trap-door device for nests which automatically traps the fowl entering the nest so that she will remain locked up therein until released by an attendant.

Moreover, the present invention consists in the combination and arrangement of parts described in this specification and set forth in the claims.

In the accompanying drawings forming part of this specification wherein like numbers of reference denote like parts wherever they occur, Figure 1 is a plan view in elevation looking at the front or outside of the device embodying the present invention with the trap-doors in open position; Fig. 2 is a plan view in elevation looking at the rear or inside of the device embodying the present invention with the trap-doors in closed position; and Fig. 3 is a vertical cross-sectional view of Fig. 1 on a line adjacent the swinging hook support for the trap doors showing, in dotted lines, a position of said hook to permit the trap doors to close, and showing, also, in dot and dash lines, a fragmentary portion of a nest or coop in association with the device embodying the present invention.

Frame-plate 1 may be made of any suitable material, such, for instance, as sheet metal, and an opening 2 may be formed therein, said opening being adapted to communicate with the entrance of the hen's nest or coop 3, Fig. 3, and being adapted substantially to form the entrance of said nest or coop. The outer edges of frame-plate 1 may be provided with rearwardly turned flanges 4 adapted to space the body of said frame-plate away from said nest or coop and adapted, also, for other purposes hereinafter described. Flanges 4 may bear extensions 5 extending laterally beyond the outer edges of said frame-plate at the top and at both sides thereof as best seen in Figs. 1 and 2. A flange 4 with its extension 5 may be substantially L-shaped in cross-section as best seen in Fig. 3.

As shown in the drawings and as best seen in Fig. 3, opening 2 is preferably so disposed that the lower edge thereof may be substantially level with the bottom or floor of the nest or coop 3, so that the hen entering said opening into said nest or coop will find easy access and will not be required to step up over an inconvenient height of frame-plate material adjacent the approach to said opening or entrance.

A pair of guides 6 may be provided borne by the inner side of the upper portion of frame-plate 1 above opening 2, said guides being preferably formed by cutting out a portion of said frame-plate and bending said cut-out portion inwardly and downwardly, the purpose of said guides being hereinafter more particularly described. A pair of stops 7 may be provided borne by the inner wall of said frame-plate, one near the edge of each vertical side of opening 2, said stops being preferably constructed by bending cut-out portions of said frame-plate inwardly and on an incline away from the inner surface of said frame-plate. An opening 8 may be provided in the upper portion of frame-plate 1 above opening 2 and preferably intermediate the vertical side-edges of said frame-plate, the purpose of said opening being hereinafter more particularly described.

Appropriate openings 9, such, for instance, as the openings 9 best seen in Figs. 1 and 2, may be provided in extensions 5 of flange 4, whereby frame-plate 1 may be removably supported upon nails, hooks, or other means (not shown) borne by the nest or coop 3 to support the device of this invention removably in position adjacent the entrance of said nest or coop.

In constructing frame-plate 1 of sheet metal or the like, the hereinabove described parts associated therewith may be formed integrally with said frame-plate as shown in the accompanying drawings, and thus provide a simple and cheap construction.

A pair of doors 10 may be pivotally attached to frame-plate 1 by means of rivets 11, or the like, so that each of said doors may be swung on its pivotal attachment to and from closed position, Fig. 2, and to and from open position, Fig. 1, guide-members 6 being adapted to guide and receive the adjacent free sides of said doors swung to said open position, the bottom portions of said doors in said closed position being adapted to swing upwardly, one overlapping the other to said open position, and stops 7 being adapted to limit the arc of the swing of said doors in their downward movement to closed position, said doors being adapted to be swung upwardly to open position, Fig. 1, to provide an ample entrance for a hen and being adapted, also, to be swung to closed position, Fig. 2, to close said entrance, there being an opening 12 in each door, which openings are adapted approximately to register with each other in overlapped portions of said doors and approximately to register with opening 8 when said doors are swung to open position, Fig. 1, to form a common opening.

A swinging member 13 may be pivotally supported on flange 4 adjacent the upper edge of frame-plate 1, by any suitable means, such, for instance, as by means of the looped end 14 looped under and over said flange through appropriate openings in said flange, as shown in the drawings, so that said swinging member may be adapted to swing inwardly away from the inner wall of said frame-plate and the parts associated therewith, said swinging member being provided with a nose-piece on hook 15, said hook being adapted to be protruded outwardly through openings 8 and being adapted to protrude through openings 8 and 12 when doors 10 are swung to open position, as shown in Fig. 1, said hook thus being adapted to support said doors in said open position. The free end of said swing member 13 may bear extending laterally therefrom a horizontal portion 16, said portion being adapted to extend horizontally across the upper portion of opening 2.

Swinging member 13, pivotal attachment 14, nose-piece or hook 15, and horizontal portion 16 may be of any suitable construction or material and may be made of a suitable length of wire, bent, as best seen in Fig. 2, to form said parts, the construction being such that when doors 10 are in open position, Fig. 1, the lower bar of horizontal portion 16 will be at a sufficient distance above the lower edge of opening 2 to permit the hen to enter under said bar and through said opening into said nest or coop 3, the doors 9 being swung clear above said lower bar.

In operation, frame 1 may be supported by means of openings 9 adjacent the entrance of nest or coop 3, so that opening 2 may be adapted to communicate with said entrance, and doors 10 may be swung toward open position, Fig. 1, in which movement portions of the edge of said doors slidably engage the inclined ridge of said nose-piece or hook 15, until the end of said hook reaches and enters openings 12 when nose-piece or hook 15 will protrude through openings 12 of said doors and through opening 8 in frame-plate 1, thus supporting said doors in said open position, and in which position horizontal portion 16 is adapted to extend across the upper portion of opening 2 at a height appropriate for the purpose of this invention.

A hen or other fowl advancing into nest or coop 3 for the purpose of laying, will find free access through opening 2 beneath horizontal portion 16, the head of the fowl being naturally extended forward below the level of her back, but the back of the fowl will strike said horizontal portion 15, and will cause said horizontal portion and member 13 together with nose-piece or hook 15 to swing inwardly on pivotal attachment 11, thus withdrawing said nose-piece or hook inwardly away from opening 8 and away from openings 12 in doors 10 in the position Fig. 1, said member, hook, and horizontal portion being so swung inwardly substantially to the position shown in dotted lines in Fig. 3, wherein said hook is entirely withdrawn from said openings, whereupon doors 10 will drop to closed position, Fig. 2, and the hen having passed into nest 3, member 13 will by gravity swing back so that hook 15 will protrude through opening 8 and horizontal portion 16 will rest against the inner side of closed doors 10, as shown in said Fig. 2, stops 7 being adapted to limit the arc of the downward swinging movement of said doors, and portions of said stops will engage portions of the adjacent surface of said doors to prevent a tendency of the doors to flap inwardly should pressure be exerted on said doors from without, and portions of said frame-plate adjacent edges of said doors being adapted to prevent the doors from flapping outwardly should pressure be exerted against them from within. Thus the fowl is automatically and securely trapped within nest 3, and will remain so until an attendant releases her by swinging the doors 10 to open position, Fig. 1, in which position swinging member 13 and parts associated therewith automatically operate to hold said doors until dropped by the movement of said member by the entrance of another fowl. Flange 4 borne by the edges of frame-plate 1 serve to space said frame-plate away from adjacent portions of nest or coop 3, and provides a recess or space for the disposition and operation therein of the various parts hereinabove described associated with the inner side of said frame-plate.

Among the advantages of the device embodying the present invention are those of simplicity of construction, economy in manufacture, adaptability to use in connection with coops and nests of different constructions, and of providing a removable trap-door that may be attached to a nest or coop when it is desired to trap fowls therein, or, when the trapping feature is not desired, said device may be removed from said nest or coop.

It is, of course, understood that the protrudable length of nose-piece or hook 15 is preferably such that same will not release doors 10 in open position shown in Fig. 1 to permit same to drop to closed position, Fig. 2, until the fowl has entered into nest 3, so that should the fowl turn around and go out and not enter entirely, the doors will not close, but will remain open to permit another fowl to enter.

Various changes in construction and in the arrangement and combination of parts may be made without departing from the nature and spirit of the present invention.

I claim:

1. A trapping device for the entrance of a nest or coop for fowls, said device comprising a frame adapted to be removably supported over said entrance, said frame having an opening therein adapted to form a door-way for said entrance, said frame having, also, a second opening therein over said door-way, a pair of doors for said door-way pivotally attached to said frame, each of said doors being adapted to swing on its pivotal attachment in a plane substantially parallel to the plane of said frame, a member having one end pivotally attached to the upper portion of said frame, said member being adapted normally to suspend from its pivotal attachment vertically adjacent the inner wall of said frame, a forwardly protruding member borne by said pivotally attached member adjacent said second opening, said forwardly protruding member being adapted to support said doors releasably in open position and to protrude forwardly through said second opening, and means borne by the free end of said pivotally attached member adapted to engage a portion of the body of a fowl entering said nest or coop through said door-way to release said support to permit said doors to drop to closed position.

2. A trapping device for the entrance of a nest or coop for fowls, said device comprising a frame adapted to be removably supported over said entrance, said frame having an opening therein adapted to form a door-way for said entrance, a pair of doors for said opening pivotally attached to said frame, each of said doors being adapted to swing on its pivotal attachment to describe an arc in a plane substantially parallel to the plane of said frame, a member having one end pivotally attached to said frame, means borne by said member intermediate its attached end and its free end adapted releasably to support said doors in open position, means borne by the free end of said member adapted to engage a portion of the body of a fowl entering said nest or coop through said door-way to release said support to permit said doors to drop to closed position, and means borne by said frame adapted to limit the arcual swing of said doors in their movement from open to closed position.

3. A trapping device for the entrance of a nest or coop for fowls, said device comprising a frame adapted to be removably supported over said entrance, said frame surrounding an opening adapted to form a door-way for said entrance, a pair of doors for said opening pivotally attached to said frame, each of said doors being adapted to swing on its pivotal attachment to describe an arc in a plane substantially parallel to the plane of said frame, each of said doors having an opening in its free end, said frame having a marginal opening therein above said door-way, said marginal opening and said opening in the free ends of said doors being adapted to form a common opening when said doors are swung to open position, a member having one end pivotally attached to said frame, means borne by said member adjacent said marginal opening, said means being adapted to protrude through said common opening when said doors are in open position to support said doors releasably in said open position, and means borne by the free end of said member adapted to engage a portion of the body of a fowl entering said nest or coop through said door-way to release said support to permit said doors to drop to closed position.

4. In a trapping device for the entrance of a nest comprising a frame, a swinging member pivotally supported from the top of the frame, a hook carried by said member intermediate its ends, said frame having an opening through which the hook may project, a pair of doors pivotally mounted on said frame to move in a plane substantially parallel to the plane of the frame, said doors each being provided with an opening which registers with the said opening in the frame when the doors are in open position, whereby the said hook may project therethrough to lock the doors in open position, and means borne by the free end of said member to engage the body of a fowl entering said nest through said doorway to release said support to permit the doors to drop to closed position.

In testimony whereof I hereunto affix my signature in the presence of two witnesses.

FRANK N. CORDELL.

Witnesses:
NANCY C. THOMAS,
WALTER C. GUELS.

Copies of this patent may be obtained for five cents each, by addressing the "Commissioner of Patents, Washington, D. C."